(12) United States Patent
Nagae

(10) Patent No.: US 10,313,614 B2
(45) Date of Patent: Jun. 4, 2019

(54) IMAGE PROCESSING APPARATUS

(71) Applicant: CANON KABUSHIKI KAISHA, Tokyo (JP)

(72) Inventor: Ryuichi Nagae, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 388 days.

(21) Appl. No.: 14/731,253

(22) Filed: Jun. 4, 2015

(65) Prior Publication Data

US 2015/0358572 A1 Dec. 10, 2015

(30) Foreign Application Priority Data

Jun. 9, 2014 (JP) ................................ 2014-119050

(51) Int. Cl.
| | |
|---|---|
| *H04N 5/38* | (2006.01) |
| *H04N 5/357* | (2011.01) |
| *H04N 5/232* | (2006.01) |
| *H04N 5/235* | (2006.01) |
| *H04N 5/243* | (2006.01) |
| *H04N 7/18* | (2006.01) |

(52) U.S. Cl.
CPC ........... *H04N 5/357* (2013.01); *H04N 5/2355* (2013.01); *H04N 5/23206* (2013.01); *H04N 5/243* (2013.01); *H04N 7/183* (2013.01)

(58) Field of Classification Search
CPC .. H04N 5/23206; H04N 5/2355; H04N 5/243; H04N 5/357; H04N 7/183
See application file for complete search history.

(56) References Cited

U.S. PATENT DOCUMENTS

| | | | |
|---|---|---|---|
| 2008/0246981 A1* | 10/2008 | Ido ....................... | H04N 1/6058 358/1.9 |
| 2010/0188676 A1* | 7/2010 | Ohashi .................. | G06F 3/1205 358/1.9 |
| 2011/0261424 A1* | 10/2011 | Matsuoka ................ | H04N 1/40 358/505 |
| 2012/0069131 A1* | 3/2012 | Abelow ............... | G06Q 10/067 348/14.01 |
| 2013/0093907 A1* | 4/2013 | Niida .................. | H04L 65/4092 348/211.4 |

FOREIGN PATENT DOCUMENTS

JP 2008-236142 A 10/2008

* cited by examiner

*Primary Examiner* — Md N Haque
(74) *Attorney, Agent, or Firm* — Canon U.S.A., Inc. I.P. Division

(57) ABSTRACT

An image processing apparatus capable of communicating with an external apparatus via a network includes a correction processing unit configured to perform correction processing of an image, a reception unit configured to receive a command including setting information, which is used by the correction processing unit to perform the correction processing, a determination unit configured to determine a communication protocol usable for the command, and a first conversion unit configured to convert the setting information according to a result of determination by the determination unit.

9 Claims, 12 Drawing Sheets

FIG. 6A

```xml
<xs:complexType name="ImagingSettings20">
    <xs:sequence>
        <xs:element name="BacklightCompensation" type="tt:BacklightCompensation20" minOccurs="0"/>
        <xs:element name="Brightness" type="xs:float" minOccurs="0"/>
        <xs:element name="ColorSaturation" type="xs:float" minOccurs="0"/>
        <xs:element name="Contrast" type="xs:float" minOccurs="0"/>
        <xs:element name="Exposure" type="tt:Exposure20" minOccurs="0"/>
        <xs:element name="Focus" type="tt:FocusConfiguration20" minOccurs="0"/>
        <xs:element name="IrCutFilter" type="tt:IrCutFilterMode" minOccurs="0"/>
        <xs:element name="Sharpness" type="xs:float" minOccurs="0"/>
        <xs:element name="WideDynamicRange" type="tt:WideDynamicRange20" minOccurs="0"/>
        <xs:element name="WhiteBalance" type="tt:WhiteBalance20" minOccurs="0"/>
        <xs:element name="Extension" type="tt:ImagingSettingsExtension20" minOccurs="0"/>
    </xs:sequence>
    <xs:anyAttribute processContents="lax"/>
</xs:complexType>
```

FIG. 6B

```xml
<xs:complexType name="ImagingSettingsExtension20">
    <xs:sequence>
        <xs:any namespace="##other" processContents="lax" minOccurs="0" maxOccurs="unbounded"/>
        <xs:element name="ImageStabilization" type="tt:ImageStabilization" minOccurs="0"/>
        <xs:element name="Extension" type="tt:ImagingSettingsExtension202" minOccurs="0"/>
    </xs:sequence>
</xs:complexType>
```

FIG. 6C

```xml
<xs:complexType name="ImagingSettingsExtension202">
    <xs:sequence>
        <xs:element name="IrCutFilterAutoAdjustment" type="tt:IrCutFilterAutoAdjustment" minOccurs="0" maxOccurs="unbounded"/>
        <xs:element name="Extension" type="tt:ImagingSettingsExtension203" minOccurs="0"/>
    </xs:sequence>
</xs:complexType>
```

FIG. 6D

```xml
<xs:complexType name="ImagingSettingsExtension203">
    <xs:sequence>
        <xs:element name="DarkCompensation" type="tt:DarkCompensation" minOccurs="0" maxOccurs="unbounded"/>
        <xs:element name="Extension" type="tt:ImagingSettingsExtension204" minOccurs="0"/>
    </xs:sequence>
</xs:complexType>
```

FIG. 6E

```xml
<xs:complexType name="ImagingSettingsExtension204">
    <xs:sequence>
        <xs:any namespace="##targetNamespace" processContents="lax" minOccurs="0" maxOccurs="unbounded"/>
    </xs:sequence>
</xs:complexType>
```

FIG. 7A

```
<s:Body
 .
 .
        <SetImagingSettings xmlns="http://www.onvif.org/ver20/imaging/wsdl">
            <ImagingSettings xmlns="http://www.onvif.org/ver20/imaging/wsdl">
                <BacklightCompensation xmlns="http://www.onvif.org/ver10/schema">    7001
                    (Setting Value for BacklightCompensation)
                <BacklightCompensation/>
                <WideDynamicRange xmlns="http://www.onvif.org/ver10/schema">    ~7002
                    (Setting Value for WideDynamicRange)
                <WideDynamicRange/>
                <DarkCompensation xmlns="http://www.onvif.org/ver10/schema">    ~7003
                    (Setting Value for DarkCompensation)
                <DarkCompensation/>
            </ImagingSettings>
        </SetImagingSettings>
 .
 .
</s:Body>
```

FIG. 7B

```
<BacklightCompensation xmlns="http://www.onvif.org/ver10/schema">
        <Mode>
            ON
        </Mode>
        <Level>
            1.8
        </Level>
<BacklightCompensation/>
```

FIG. 7C

```
<WideDynamicRange xmlns="http://www.onvif.org/ver10/schema">
        <Mode>
            ON
        </Mode>
        <Level>
            1.5
        </Level>
<WideDynamicRange/>
```

FIG. 7D

```
<DarkCompensation xmlns="http://www.onvif.org/ver10/schema">
        <Mode>
            Auto
        </Mode>
<DarkCompensation/>
```

FIG. 8

| VALUE OF Level IN COMMAND → | 0~0.14 | 0.14~0.29 | 0.29~0.43 | 0.43~0.57 | 0.57~0.71 | 0.71~0.86 | 0.86~1.00 |
|---|---|---|---|---|---|---|---|
| VALUE OF Level TO BE ACTUALLY SET | 1 | 2 | 3 | 4 | 5 | 6 | 7 |

FIG. 11

| VALUE OF Level ACTUALLY SET → | 1 | 2 | 3 | 4 | 5 | 6 | 7 |
|---|---|---|---|---|---|---|---|
| VALUE OF Level TO BE TRANSMITTED | 0.07 | 0.21 | 0.35 | 0.50 | 0.64 | 0.78 | 0.93 |

IMAGE PROCESSING APPARATUS

BACKGROUND OF THE INVENTION

Field of the Invention

The present invention relates to an image processing apparatus, and, more particularly, to an image processing apparatus that performs processing on an image.

Description of the Related Art

Japanese Patent Application Laid-Open No. 2008-236142 discusses an imaging apparatus that combines a long-time exposure signal and a short-time exposure signal so as to enlarge the dynamic range of an image. The method to enable such wide dynamic range shooting includes, for example, a technique to correct, for example, an object image with a large intensity difference while changing processing conditions, such as a gain, so as to adjust the dynamic range.

Furthermore, there are known standard protocols used to standardize communication interfaces between an imaging apparatus and an external apparatus, which communicates with the imaging apparatus via a network. Examples of such standard protocols include a common standard formulated by Open Network Video Interface Forum (hereinafter referred to as "ONVIF" in some cases). In the above-mentioned protocol, ImagingSettings is defined as an aggregation of control commands about various processing conditions related to image quality issued from external apparatuses.

Such an above-mentioned imaging apparatus may allow apparatuses of various types or apparatuses produced by various manufacturers to connect thereto via networks. Then, the various apparatuses may perform communications using the respective different protocols. Additionally, some imaging apparatuses are equipped with techniques to correct a captured image with a large intensity difference (hereinafter referred to as "exposure compensation" in some cases). However, since different exposure compensation methods may be employed in respective types of imaging apparatuses, it is difficult for one and the same apparatus to control such imaging apparatuses.

SUMMARY OF THE INVENTION

According to an aspect of the present invention, an image processing apparatus capable of communicating with an external apparatus via a network includes a correction processing unit configured to perform correction processing of an image, a reception unit configured to receive a command including setting information, which is used by the correction processing unit to perform the correction processing, a determination unit configured to determine a communication protocol usable for the command, and a first conversion unit configured to convert the setting information according to a result of determination by the determination unit.

Further features of the present invention will become apparent from the following description of exemplary embodiments with reference to the attached drawings.

BRIEF DESCRIPTION OF THE DRAWINGS

FIGS. 6A, 6B, 6C, 6D, and 6E illustrate XML Schema Definition (XSD) of ImagingSettings.

FIGS. 7A, 7B, 7C, and 7D illustrate a configuration example of the SetImagingSettings command.

FIG. 8 illustrates an example of a conversion table.

FIG. 11 illustrates an example of a conversion table.

DESCRIPTION OF THE EMBODIMENTS

Various exemplary embodiments, features, and aspects of the invention will be described in detail below with reference to the drawings.

The configuration described in the following exemplary embodiment is merely an example, and the present invention is not intended to be limited to the illustrated configuration. Furthermore, suppose that commands, etc., described in the following exemplary embodiment are defined based on, for example, the ONVIF standard.

Figure 1:
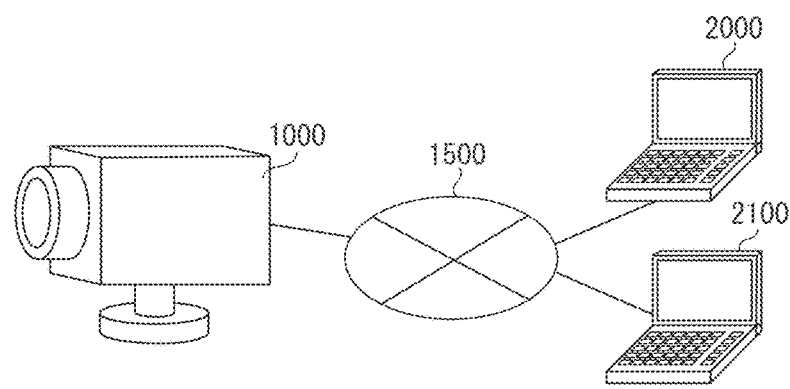
FIG. 1 illustrates an example of a system configuration of a monitoring system.

First, a network configuration according to an exemplary embodiment of the present invention is described with reference to FIG. 1. More specifically, FIG. 1 illustrates an example of a system configuration of a monitoring system according to the present exemplary embodiment.

In the monitoring system according to the present exemplary embodiment, an imaging apparatus (a monitoring camera) 1000, which captures a moving image, etc., is connected to external apparatuses (client apparatuses) 2000, 2100, etc., via an Internet Protocol (IP) network 1500 (via a network), and is thus capable of communicating with the individual external apparatuses 2000, 2100, etc. Accordingly, the imaging apparatus 1000 is able to deliver (transmit) a captured image to the external apparatuses (client apparatuses) 2000, 2100, etc., via the IP network 1500.

The imaging apparatus 1000 according to the present exemplary embodiment is an example of an image processing apparatus, and is, for example, a monitoring camera. The external apparatuses 2000, 2100, etc., are, for example, personal computers (PCs). The monitoring system according to the present exemplary embodiment corresponds to an imaging system (an image processing system).

Furthermore, the IP network 1500 is composed of a plurality of routers, switches, and cables, which satisfy a communication standard, such as Ethernet. However, in the present exemplary embodiment, the IP network 1500 has no restrictions on communication standard, size, and configuration, as long as it is capable of enabling communications between the imaging apparatus 1000 and the external apparatuses 2000, 2100, etc.

For example, the IP network 1500 may be composed of the Internet, a wired local area network (LAN), a wireless LAN, or a wide area network (WAN). Furthermore, the imaging apparatus 1000 according to the present exemplary embodiment may be compliant with, for example, Power Over Ethernet (PoE) (registered trademark) or may be supplied with electric power via a LAN cable.

Each of the external apparatuses 2000, 2100, etc., can transmit various control commands to the imaging apparatus 1000. These control commands include, for example, commands for changing the imaging direction and angle of field of the imaging apparatus 1000, commands for changing imaging parameters, and commands for starting image streaming.

On the other hand, the imaging apparatus 1000 transmits, to the external apparatuses 2000, 2100, etc., responses to those commands or image streaming. Furthermore, the imaging apparatus 1000 changes the angle of field or the like in response to the commands for changing the angle of field received from the external apparatuses 2000, 2100, etc.

Figure 2:
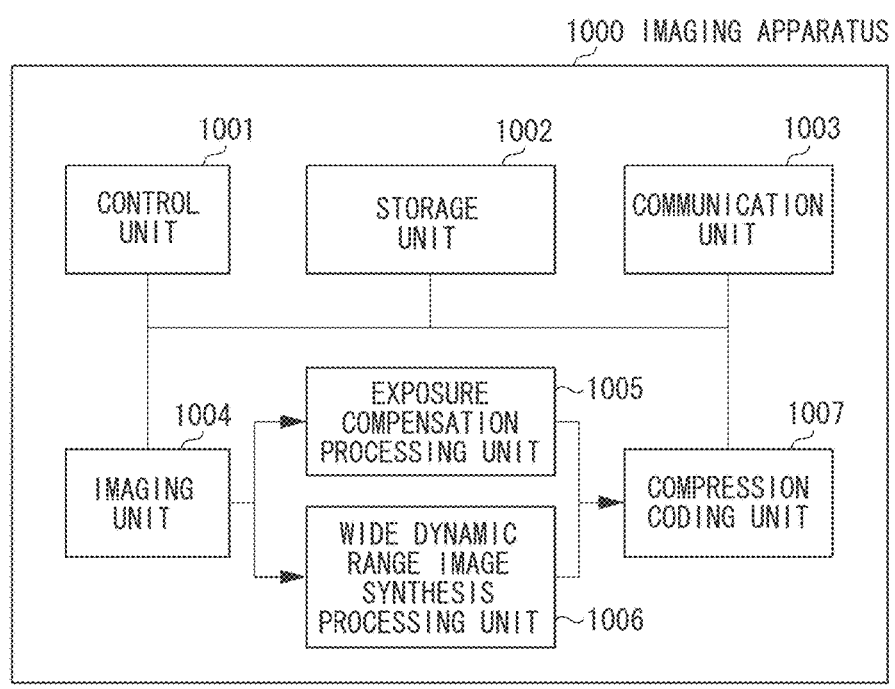
FIG. 2 is a block diagram illustrating an example of a hardware configuration of an imaging apparatus (a monitoring camera).

Next, FIG. 2 illustrates an example of a hardware configuration of the imaging apparatus 1000 according to the present exemplary embodiment.

A control unit 1001 illustrated in FIG. 2 comprehensively controls the various constituent elements of the imaging apparatus 1000. The control unit 1001 is composed of a central processing unit (CPU). Then, the control unit 1001 executes computer programs stored in a storage unit (a storage medium) 1002. Alternatively, the control unit 1001 may perform control using a hardware configuration.

The storage unit 1002 is used as storage regions for various pieces of data, such as a storage region for programs to be executed mainly by the control unit 1001, a work region used during execution of the programs, and a storage region for captured images generated by an imaging unit 1004, which is described below. Furthermore, the storage unit 1002 stores parameters and conversion tables, which are used for various correction or compensation operations.

A communication unit 1003 receives various control commands from the external apparatuses 2000, 2100, etc. Furthermore, the communication unit 1003 transmits various control commands to the external apparatuses 2000, 2100, etc. In the present exemplary embodiment, the communication unit 1003 is able to communicate with the external apparatuses 2000, 2100, etc., based on at least a unique protocol and protocols compliant with the ONVIF standard. Which protocol is to be used for the imaging apparatus 1000 to perform communication may be determined at the time of factory shipment or determined by the user, or may be switched according to the communication from the external apparatus 2000.

The imaging unit 1004 is composed of an imaging optical system (not illustrated), an image sensor, such as a charge-coupled device (CCD) sensor or a complementary metal-oxide semiconductor (CMOS) sensor, etc. The imaging unit 1004 captures an object image formed by the imaging optical system to generate an analog signal. Furthermore, the imaging unit 1004 may contain an analog-to-digital (AD) conversion unit that converts the generated analog signal into digital data.

Then, the imaging unit 1004 outputs the converted digital data as a captured image to the storage unit 1002, an exposure compensation processing unit 1005, and a wide dynamic range image synthesis processing unit 1006.

The exposure compensation processing unit 1005 analyzes one captured image output from the imaging unit 1004 and performs exposure compensation processing on the captured image based on the contents of image processing setting stored in the storage unit 1002. Furthermore, the exposure compensation processing unit 1005 outputs the captured image subjected to exposure compensation processing to the storage unit 1002.

The exposure compensation processing in the present exemplary embodiment includes backlight compensation processing and dark compensation processing. Here, the term "backlight compensation processing" means processing for brightening a captured image containing a dark portion in a backlight condition by gain correction for the captured image. The term "dark compensation processing" means image processing for determining a dark portion contained in the captured image and intensively brightening and compensating the determined dark portion by gain correction.

Furthermore, the exposure compensation processing in the present exemplary embodiment is provided with an exposure setting function for setting an exposure condition of the imaging unit 1004. Here, the exposure condition includes an aperture value of the imaging optical system, included in the imaging unit 1004, and an exposure time (accumulation time) of the image sensor, included in the imaging unit 1004.

The exposure compensation processing unit 1005 in the present exemplary embodiment corresponds to an exposure setting unit configured to set an exposure condition of the imaging unit 1004 and to acquire one captured image generated by the imaging unit 1004 capturing an object image under the set exposure condition.

The wide dynamic range image synthesis processing unit 1006 performs wide dynamic range (WDR) processing for widening the dynamic range of a captured image output from the imaging unit 1004 based on the contents of image processing setting stored in the storage unit 1002. Here, in some cases, the term "wide dynamic range" is referred to as "WDR", and the term "wide dynamic range image synthesis processing (dynamic range widening processing)" is referred to as "WDR processing".

The WDR processing is to generate one composite captured image with a wide dynamic range by acquiring a plurality of images with respective different exposure conditions output from the imaging unit 1004 and determining and combining more appropriately bright portions of the plurality of images. Then, the WDR image synthesis processing unit 1006 outputs the generated composite captured image to the storage unit 1002.

The WDR image synthesis processing unit 1006 in the present exemplary embodiment corresponds to a synthesis unit configured to generate one composite captured image by combining a plurality of captured images generated by the imaging unit 1004 capturing an object image under the respective different exposure conditions.

A compression coding unit 1007 performs compression coding processing on the captured images output from the imaging unit 1004, the exposure compensation processing unit 1005, and the WDR image synthesis processing unit 1006, based on the contents of compression coding setting compliant with the JPEG, H.264, or H.265 format. The compression coding setting is stored in the storage unit 1002. Then, the compression coding unit 1007 outputs the captured signal subjected to compression coding processing to the storage unit 1002 or the communication unit 1003.

When a request for streaming transmission is received from the external apparatus 2000, etc., the imaging apparatus 1000 in the present exemplary embodiment streams and transmits the captured image, output from the compression coding unit 1007, to the outside via the communication unit 1003.

Figure 3:
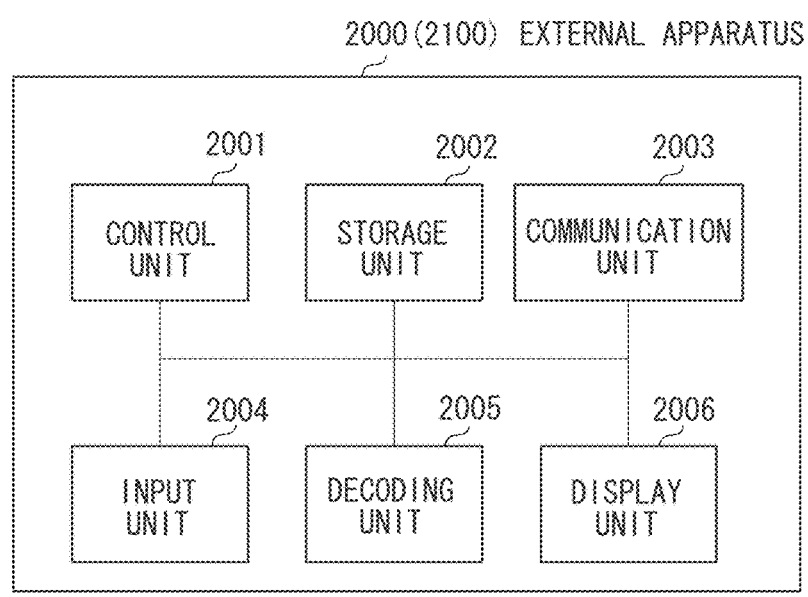
FIG. 3 is a block diagram illustrating an example of a hardware configuration of an external apparatus.

Next, FIG. 3 illustrates an example of a hardware configuration of each of the external apparatuses 2000, 2100, etc., according to the present exemplary embodiment. Each of the external apparatuses 2000, 2100, etc., is composed of a computer apparatus connected to the IP network 1500. Furthermore, the hardware configuration of the external apparatus 2000 is similar to that of the external apparatus 2100.

A control unit 2001 illustrated in FIG. 3 controls the entire external apparatus 2000 (or the entire external apparatus 2100). The control unit 2001 is composed of, for example, a CPU, and executes programs stored in a storage unit 2002, which is described below. Alternatively, the control unit 2001 may perform control using a hardware configuration.

The storage unit 2002 is used as a storage region for programs to be executed by the control unit 2001, a work region used during execution of the programs, and a storage region for data.

A communication unit 2003 transmits a command, etc., to the imaging apparatus 1000 in response to an instruction from the control unit 2001. Moreover, the communication unit 2003 receives, from the imaging apparatus 1000, a response to the command, a captured image that has been streamed, etc. In the present exemplary embodiment, the communication unit 2003 is able to perform communication with the imaging apparatus 1000 according to at least a unique protocol or a protocol defined in the ONVIF standard. In the present exemplary embodiment, suppose that the external apparatus 2000 performs communication according to the protocol defined in the ONVIF standard, and the external apparatus 2001 performs communication according to the protocol defined in the ONVIF standard.

While, in the present exemplary embodiment, it is supposed that the external apparatuses 2000, 2100, etc., perform communications according the respective predetermined protocols, which protocol is to be used to perform communication may be determined at the time of factory shipment or determined by the user, or may be switched among a plurality of protocols as needed.

An input unit 2004 is composed of, for example, buttons, arrow keys, a touch panel, and a mouse. The input unit 2004 receives input of an instruction from the user. For example, the input unit 2004 can receive input of, as an instruction from the user, an instruction to transmit various commands to the imaging apparatus 1000.

Furthermore, when receiving input of an instruction from the user to transmit a command to the imaging apparatus 1000, the input unit 2004 notifies the control unit 2001 of the input of the instruction. Then, the control unit 2001 generates a command, to be transmitted to the imaging apparatus 1000, according to the instruction input to the input unit 2004. Then, the control unit 2001 instructs the communication unit 2003 to transmit the generated command to the imaging apparatus 1000.

Furthermore, the input unit 2004 can receive input of a response of the user to an inquiry message to the user generated by the control unit 2001 executing a program stored in the storage unit 2002.

A decoding init 2005 decodes and decompresses a captured image output from the communication unit 2003. Then, the decoding unit 2005 outputs the decoded and decompressed captured image to a display unit 2006. Accordingly, the display unit 2006 displays an image corresponding to the captured image output from the decoding unit 2005.

Furthermore, the display unit 2006 can display an inquiry message to the user generated by the control unit 2001 executing a program stored in the storage unit 2002.

While the internal configurations of the imaging apparatus 1000 and the external apparatus 2000 have been described above, the processing block diagrams of FIGS. 2 and 3 illustrate example configurations of an imaging apparatus and an external apparatus according to the present exemplary embodiment, and these configurations are not restrictive. The imaging apparatus 1000 and the external apparatus 2000 may be modified and altered in various manners, for example, may be provided with an audio input unit and an audio output unit.

Figure 4:
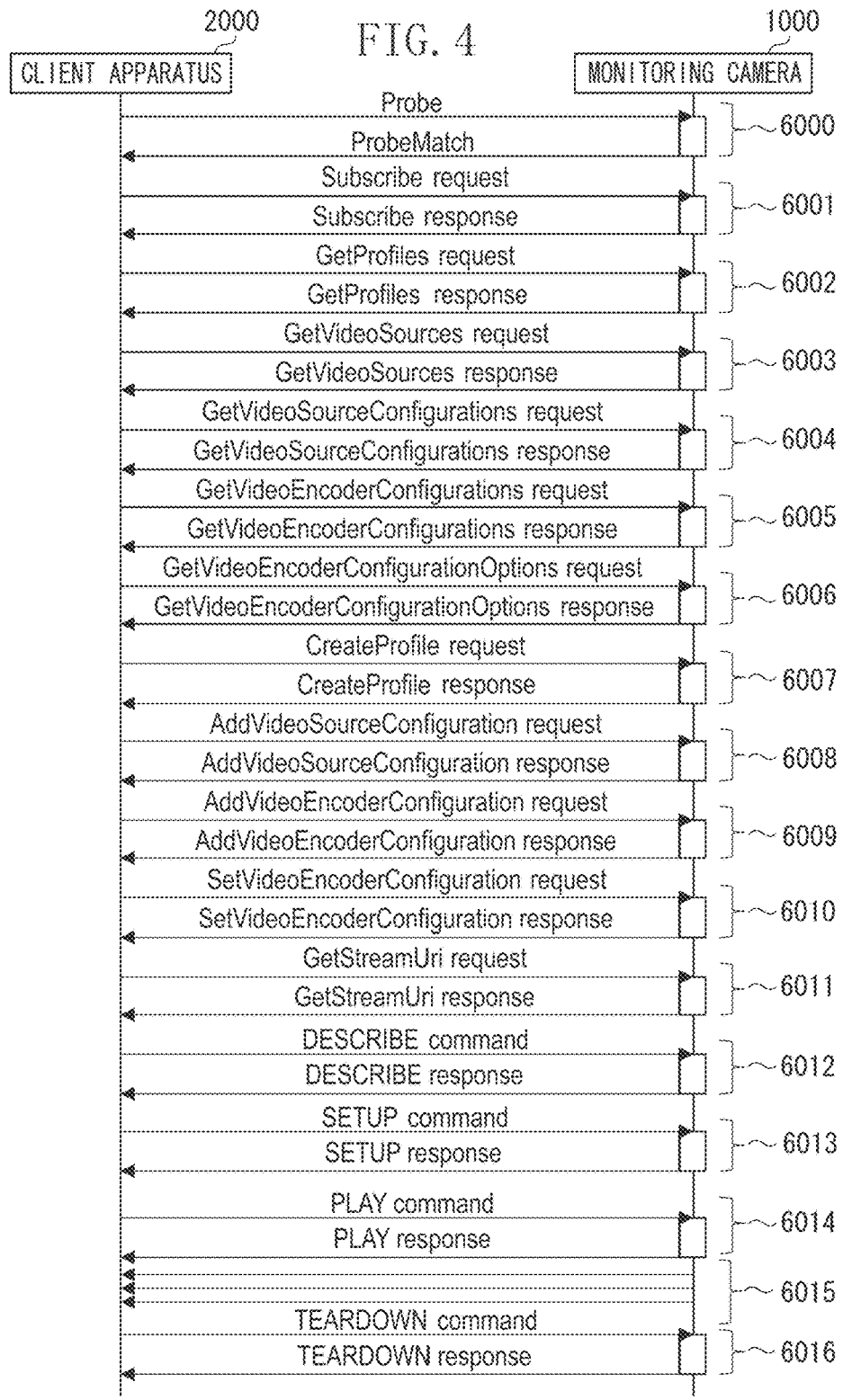
FIG. 4 is a sequence diagram illustrating a typical command sequence between the imaging apparatus and the external apparatus performed up to the start of streaming transmission of a captured image.

Next, FIG. 4 is a sequence diagram illustrating a typical command sequence between the imaging apparatus (the monitoring camera) 1000 and the external apparatus (the client apparatus) 2000 performed from the start of setting of parameters of a captured image to be streamed to the time when the captured image starts being streamed.

The term "transaction" in the present exemplary embodiment means a pair of a command to be transmitted from the external apparatus 2000 to the imaging apparatus and a response to be returned from the imaging apparatus 1000 to the external apparatus 2000 in response to the command.

Referring to FIG. 4, a transaction 6000 is used for connection of network devices. The external apparatus 2000 transmits a Probe command, which is used for connection of network devices, to the IP network 1500 by unicast or multicast. The imaging apparatus 1000, which is network-connected, returns a ProbeMatch response, which indicates that the imaging apparatus 1000 has become ready to receive a command, to the external apparatus 2000.

A transaction 6001 is used for Subscribe. This transaction enables the external apparatus 2000 to instruct the imaging apparatus 1000 to perform event delivery.

A transaction 6002 is used for GetProfiles. This transaction is used to acquire a MediaProfile corresponding to a delivery profile. Here, the term "MediaProfile" means a set of parameters for storing various setting items of the imaging apparatus 1000 in association with one another.

These various setting items include a ProfileToken, which is an ID of the MediaProfile, a VideoSourceConfiguration, which is described below, a VideoEncoderConfiguration, which is described below, and an encoder for audio. Then, the MediaProfile is used to hold links to the various setting items.

The external apparatus 2000 transmits a GetProfiles command to the imaging apparatus 1000. Then, the imaging apparatus 1000, having received the GetProfiles command, transmits a list of MediaProfiles to the external apparatus 2000.

Accordingly, the external apparatus 2000 acquires a list of MediaProfiles that are usable in the imaging apparatus 1000, as well as delivery profile IDs for discriminating the MediaProfiles. Furthermore, the external apparatus 2000 discriminates settings of delivery profiles that are present in the imaging apparatus 1000 and are able to be delivered, based on the delivery profile IDs.

A transaction 6003 is used for a GetVideoSources command. This command enables the external apparatus 2000 to acquire a list of VideoSources stored in the imaging apparatus 1000.

Here, the term "VideoSource" means an aggregation of parameters indicating the performance of one imaging unit 1004 included in the imaging apparatus 1000. The VideoSource includes a VideoSourceToken, which is an ID of the VideoSource, and a Resolution, which indicates the resolution of a captured image that the imaging unit 1004 is able to output.

The external apparatus 2000 transmits the GetVideoSources command to the imaging apparatus 1000. Then, the imaging apparatus 1000, having received the GetVideoSources command, returns a response to this command to the external apparatus 2000.

A transaction 6004 is used for GetVideoSourceConfigurations. This transaction is used to acquire a list of VideoSourceConfigurations stored in the imaging apparatus 1000.

The term "VideoSourceConfiguration" means an aggregation of parameters for associating the VideoSources included in the imaging apparatus 1000 with the MediaProfiles. The VideoSourceConfiguration includes Bounds, which specifies which portion is to be clipped as a deliver image in a captured image output from the VideoSource.

In the following description, the VideoSourceConfiguration may be referred to as "VSC".

The external apparatus 2000 transmits a GetVideoSourceConfigurations command to the imaging apparatus 1000. Then, the imaging apparatus 1000, having received the GetVideoSourceConfigurations command, returns a list including IDs of VSCs stored in the imaging apparatus 1000 to the external apparatus 2000.

A transaction 6005 is used for GetVideoEncoderConfigurations. This transaction enables the external apparatus 2000 to acquire a list of VideoEncoderConfigurations stored in the imaging apparatus 1000.

The external apparatus 2000 transmits a GetVideoEncoderConfigurations command to the imaging apparatus 1000. Then, the imaging apparatus 1000, having received that command, returns a response to that command to the external apparatus 2000.

Here, the term "VideoEncoderConfiguration" means an aggregation of parameters for associating compression coding settings about compression coding of a captured image output from the imaging unit 1004 with the MediaProfiles. Hereinafter, the VideoEncoderConfiguration may be referred to as "VEC". The compression coding settings are stored in the storage unit 1002.

The VEC includes a VECToken, which is an ID of the VEC, an Encoding, which specifies a compression coding method (such as JPEG or H.264), a Resolution, which specifies the resolution of an output image, and a Quality, which specifies the quality of compression coding. The VEC further includes a FramerateLimit, which specifies the maximum frame rate, and a BitrateLimit, which specifies the maximum bit rate, about a captured image output from the imaging apparatus 1000.

For example, the imaging apparatus 1000 compresses and codes a captured image, which has been output from the imaging unit 1004 based on the contents of the VideoSource and the VSC, according to the parameters set in the VEC, and then delivers (transmits) the compressed and coded captured image to the external apparatus 2000.

A transaction 6006 is used for GetVideoEncoderConfigurationOptions. This transaction enables the external apparatus 2000 to acquire options of parameters and the range of setting values that the imaging apparatus 1000 is able to accept about the VEC specified by an ID.

The external apparatus 2000 transmits a GetVideoEncoderConfigurationOptions command to the imaging apparatus 1000. The imaging apparatus 1000, having received that command, returns a response to that command to the external apparatus 2000. This transaction enables the external apparatus 2000 to acquire a list including IDs of compression coding settings stored in the storage unit 1002.

A transaction 6007 is used for CreateProfile. This transaction is used to request for creation of a delivery profile. The external apparatus 2000 transmits a CreateProfile command to the imaging apparatus 1000. The imaging apparatus 1000, having received that command, returns a response to that command to the external apparatus 2000.

This transaction enables the external apparatus 2000 to create a new delivery profile within the imaging apparatus 1000 and to acquire an ID of the created delivery profile. Furthermore, the imaging apparatus 1000 stores the created new delivery profile.

After the command processing of that transaction, the imaging apparatus 1000 transmits a MediaProfile change notification event to the external apparatus 2000, thus notifying the external apparatus 2000 of a change occurring in the MediaProfile.

A transaction 6008 is used for AddVideoSourceConfiguration. This transaction is used to request for addition of a VSC. The external apparatus 2000 transmits an AddVideoSourceConfiguration command to the imaging apparatus 1000. The imaging apparatus 1000, having received that command, returns a response to that command to the external apparatus 2000.

In this transaction, the external apparatus 2000 specifies the delivery profile ID acquired in the transaction 6007 and the ID of the VSC acquired in the transaction 6004. Accordingly, the external apparatus 2000 can associate a desired VSC corresponding to the specified ID of the VSC with a MediaProfile corresponding to the specified delivery profile ID.

On the other hand, the imaging apparatus 1000 stores, into the storage unit 1002, the MediaProfile corresponding to the delivery profile ID specified by the external apparatus 2000 and the desired VSC corresponding to the ID of the VSC specified by the external apparatus 2000 in association with each other.

A transaction 6009 is used for AddVideoEncoderConfiguration. This transaction is used to request for addition of a VEC. The external apparatus 2000 transmits an AddVideoEncoderConfiguration command to the imaging apparatus 1000. The imaging apparatus 1000, having received that command, returns a response to that command to the external apparatus 2000.

In this transaction, the external apparatus 2000 specifies the delivery profile ID acquired in the transaction 6007 and the ID of the VEC acquired in the transaction 6005. Accordingly, the external apparatus 2000 can associate a VEC corresponding to the specified ID of the VEC with a MediaProfile corresponding to the specified delivery profile ID.

On the other hand, the imaging apparatus 1000 stores, into the storage unit 1002, the MediaProfile corresponding to the delivery profile ID specified by the external apparatus 2000 and the desired VEC corresponding to the ID of the VEC specified by the external apparatus 2000 in association with each other.

After the command processing of the transactions 6008 and 6009, the imaging apparatus 1000 transmits a MediaProfile change notification event to the external apparatus 2000, thus notifying the external apparatus 2000 of a change occurring in the MediaProfile.

A transaction 6010 is used for SetVideoEncoderConfiguration. This transaction is used to set parameters of the VEC. The external apparatus 2000 transmits a SetVideoEncoderConfiguration command to the imaging apparatus 1000.

The imaging apparatus 1000, having received that command, returns a response to that command to the external apparatus 2000. This transaction enables the external apparatus 2000 to set the contents of the VEC, acquired in the transaction 6005, based on the options acquired in the transaction 6006. For example, the imaging apparatus 1000 changes the compression coding method or the clipping size. The imaging apparatus 1000 stores the contents of the set compression coding settings, etc., into the storage unit 1002.

After the command processing of that transaction, the imaging apparatus 1000 transmits a VEC change notification event to the external apparatus 2000, thus notifying the external apparatus 2000 of a change occurring in the VEC.

A transaction 6011 is used for GetStreamUri. This transaction is used to request for acquisition of a delivery address. This transaction enables the external apparatus 2000 to specify the delivery profile ID acquired in the transaction 6007 and to acquire an address (uniform resource identifier (URI)) for acquiring a captured image, to be streamed, based on the setting of the specified delivery profile.

The imaging apparatus 1000 returns, to the external apparatus 2000, an address for streaming an image corresponding to the contents of the VSC and the VEC associated with the delivery profile ID specified by the external apparatus 2000.

A transaction 6012 is used for DESCRIBE. This transaction is used to request for acquisition of delivery information. The external apparatus 2000 transmits a DESCRIBE command to the imaging apparatus 1000. The imaging apparatus 1000, having received that command, returns a response to that command to the external apparatus 2000.

In this transaction, the external apparatus 2000 executes the DESCRIBE command using the URI acquired in the transaction 6011, and requests for and acquires information of content that is to be streamed by the imaging apparatus 1000.

A transaction 6013 is used for SETUP. This transaction is used to request for delivery setting. The external apparatus 2000 transmits a SETUP command to the imaging apparatus 1000. The imaging apparatus 1000, having received that command, returns a response to that command to the external apparatus 2000.

In this transaction, the external apparatus 2000 causes the imaging apparatus 1000 to prepare for streaming based on detailed data about the delivery information acquired in the transaction 6012. The execution of this command enables a transmission method for streaming including session numbers to be shared by the external apparatus 2000 and the imaging apparatus 1000.

A transaction 6014 is used for PLAY. This transaction is used to start streaming delivery. The external apparatus 2000 transmits a PLAY command to the imaging apparatus 1000. The imaging apparatus 1000, having received that command, returns a response to that command to the external apparatus 2000.

When transmitting the PLAY command to the imaging apparatus 1000, the external apparatus 2000 can use the session number acquired in the transaction 6013 to request the imaging apparatus 1000 to start streaming delivery.

A stream 6015 is delivered from the imaging apparatus 1000 to the external apparatus 2000. The stream 6015, which has been requested to start in the transaction 6014, is delivered according to the transmission method shared in the transaction 6013.

A transaction 6016 is used for TEARDOWN. This transaction is used to stop streaming delivery. The external apparatus 2000 transmits a TEARDOWN command to the imaging apparatus 1000. The imaging apparatus 1000, having received that command, returns a response to that command to the external apparatus 2000.

In this transaction, the external apparatus 2000 can specify the session number acquired in the transaction 6013 and execute the TEARDOWN command, thus requesting the imaging apparatus 1000 to stop streaming delivery.

Figure 5:
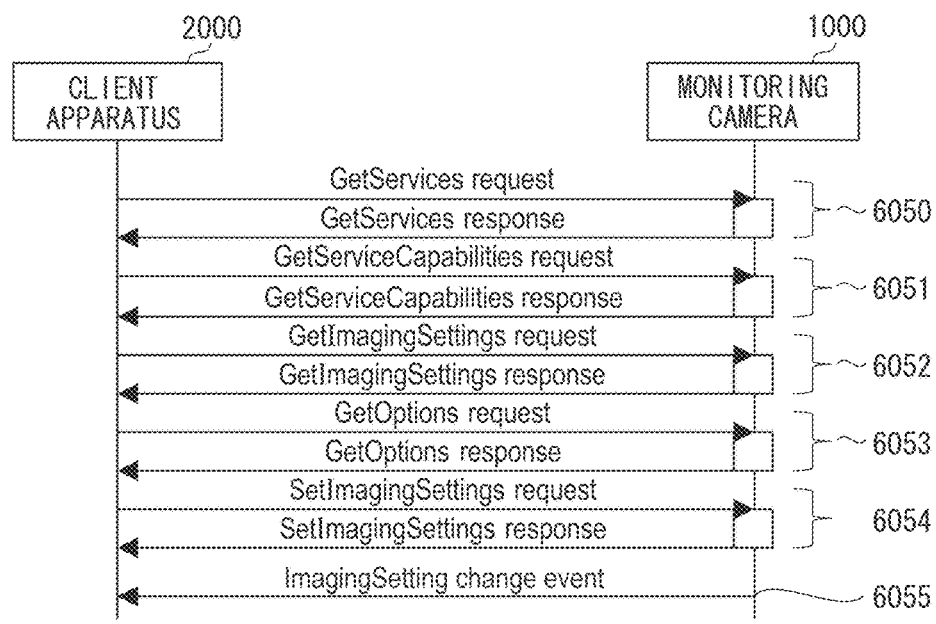
FIG. 5 is a sequence diagram illustrating a typical command sequence between the imaging apparatus and the external apparatus performed for changing ImagingSettings.

Next, FIG. 5 is a sequence diagram illustrating a typical command sequence performed between the imaging apparatus (the monitoring camera) 1000 and the external apparatus (the client apparatus) 2000 to change the ImagingSetting, which corresponds to image processing setting.

Referring to FIG. 5, a transaction 6050 is used for GetServices. This transaction enables the external apparatus 2000 to acquire the types of web services that the imaging apparatus 1000 supports and the addresses (URIs) for using the respective web services.

The external apparatus 2000 transmits a GetService to the imaging apparatus 1000. The imaging apparatus 1000, having received that command, returns a response to that command to the external apparatus 2000.

A transaction 6051 is used for GetServiceCapabilities. This transaction enables the external apparatus 2000 to acquire a list of functions of the respective web services acquired in the transaction 6050.

The external apparatus 2000 transmits a GetServiceCapabilities command to the imaging apparatus 1000. The imaging apparatus 1000, having received that command, returns a response to that command to the external apparatus 2000.

A transaction 6052 is used for GetImagingSettings. This transaction enables the external apparatus 2000 to acquire a list of ImagingSettings stored in the imaging apparatus 1000. The ImagingSettings is stored in the storage unit 1002.

The external apparatus 2000 transmits a GetImagingSettings command to the imaging apparatus 1000. The imaging apparatus 1000, having received that command, returns a response to that command to the external apparatus 2000.

A transaction 6053 is used for GetOptions. This transaction enables the external apparatus 2000 to acquire options that the imaging apparatus 1000 is able to accept, about parameters of the ImagingSettings.

The external apparatus 2000 transmits a GetOptions command to the imaging apparatus 1000. The imaging apparatus 1000, having received that command, returns a response to that command to the external apparatus 2000.

A transaction 6054 is used for SetImagingSettings. This transaction enables the external apparatus 2000 to change the contents of the ImagingSettings stored in the storage unit 1002 by transmitting new ImagingSettings to the imaging apparatus 1000.

A transaction 6055 is used for an ImagingSettings change notification event. After the command processing of the transaction 6054, the imaging apparatus 1000 transmits the ImagingSetting change notification event to the external apparatus 2000, thus notifying the external apparatus 2000 of a change occurring in the ImagingSettings.

Next, FIGS. 6A, 6B, 6C, 6D, and 6E illustrate an example of the definition of the ImagingSettings type according to the present exemplary embodiment. In the present exemplary embodiment, to define the ImagingSettings type, the XML Schema Definition language (hereinafter referred to as "XSD" in some cases), which is employed in the ONVIF standard, is used.

FIG. 6A illustrates the content of the ImagingSettings type. In the content of the ImagingSettings type illustrated in FIG. 6A, the "sequence" specifier specifies that the order of elements illustrated in FIG. 6A appears in the same manner as the definition specifies. For example, BacklightCompensation, which is described below, appears before WideDynamicRange and DarkCompensation, and WideDynamicRange appears before DarkCompensation.

In FIG. 6A, BacklightCompensation (hereinafter referred to as "BLC" in some cases) is a parameter used for the exposure compensation processing unit 1005 to turn on and off backlight compensation processing, which is an example of exposure compensation processing. The BLC may be omitted by the "minOccurs" specifier in XSD.

Brightness is a parameter for specifying the brightness of a captured image output from the imaging unit 1004. The Brightness may be omitted by the "minOccurs" specifier in XSD. ColorSaturation is a parameter for specifying the saturation of a captured image output from the imaging unit 1004. The ColorSaturation may be omitted by the "minOccurs" specifier in XSD.

Contrast is a parameter for specifying the density of color of a captured image output from the imaging unit 1004. The Contrast may be omitted by the "minOccurs" specifier in XSD. Exposure is a parameter for changing the exposure of a captured image output from the imaging unit 1004. The Exposure may be omitted by the "minOccurs" specifier in XSD.

Focus is a parameter for changing the focus setting of the imaging unit 1004. The Focus may be omitted by the "minOccurs" specifier in XSD. IrCutFilter is a parameter for changing the setting of an infrared cut filter (IRCF), which is able to be inserted into and retracted from the imaging optical system included in the imaging unit 1004.

Here, the IRCF is a filter that attenuates a part of infrared light. The IrCutFilter may be omitted by the "minOccurs" specifier in XSD.

Sharpness is a parameter for changing the setting of sharpness of a captured image output from the imaging unit 1004. The Sharpness may be omitted by the "minOccurs" specifier in XSD.

WideDynamicRange is a parameter for changing the setting of WDR processing performed by the WDR image synthesis processing unit 1006. ON and OFF can be set in the value of the WideDynamicRange. The WideDynamicRange may be omitted by the "minOccurs" specifier in XSD.

Furthermore, the WideDynamicRange the value of which is set to ON indicates that the imaging apparatus 1000 turns ON the WDR processing. The WideDynamicRange the value of which is set to OFF indicates that the imaging apparatus 1000 turns OFF the WDR processing. Accordingly, the SetImagingSettings command in the present exemplary embodiment corresponds to a synthesis command for controlling the operation of the WDR image synthesis processing unit 1006.

WhiteBalance is a parameter for adjusting the white balance of a captured image output from the imaging unit 1004. The WhiteBalance may be omitted by the "minOccurs" specifier in XSD. Furthermore, Extension includes an extended parameter that is expanded as illustrated in FIG. 6B. The Extension may be omitted by the "minOccurs" specifier in XSD.

Next, FIGS. 6B to 6E illustrate parameters that are added to the ImagingSettings illustrated in FIG. 6A. These parameters constitute a part of the image processing setting similarly to the parameters illustrated in FIG. 6A.

ImageStabilization in FIG. 6B is a parameter for the image stabilization function for a captured image output from the imaging unit 1004. Furthermore, in FIG. 6B, the "sequence" specifier specifies that the order of elements illustrated in FIG. 6B appears in the same manner as the definition specifies.

IrCutFilterAutoAdjustmetnt in FIG. 6C is a parameter for setting respective pieces of information used to insert and retract the IRCF (the luminance of an object or the delay time). In FIG. 6C, the "sequence" specifier specifies that the order of elements illustrated in FIG. 6C appears in the same manner as the definition specifies.

Furthermore, at least one of the ImageStabilization and the IrCutFilterAutoAdjustmetnt may be omitted by the "minOccurs" specifier in XSD.

DarkCompensation in FIG. 6D is a parameter for setting dark compensation processing, which is an example of exposure compensation processing performed by the exposure compensation processing unit 1005 for detecting a dark portion in a captured image output from the imaging unit 1004 and performing compensation to brighten the dark portion. In FIG. 6D, the "sequence" specifier specifies that the order of elements illustrated in FIG. 6D appears in the same manner as the definition specifies.

Furthermore, hereinafter, the term DarkCompensation may be referred to as "DC" in some cases. The DarkCompensation may be omitted by the "minOccurs" specifier in XSD.

ON, OFF, and AUTO can be set in the value of the DC. Here, the DC the value of which is set to ON indicates that the imaging apparatus 1000 turns ON the dark compensation processing. The DC the value of which is set to OFF indicates that the imaging apparatus 1000 turns OFF the dark compensation processing. Furthermore, the DC the value of which is set to AUTO indicates that the imaging apparatus 1000 is allowed to automatically determine ON and OFF of the dark compensation processing.

Accordingly, the SetImagingSettings command in the present exemplary embodiment corresponds to an exposure setting command for controlling the operation of the exposure compensation processing unit 1005.

At least one of ON, OFF, and AUTO can be set in the value of the DC. In other words, the options of the DC include ON, OFF, and AUTO.

Accordingly, in the transaction 6053 for GetOptions, the above-mentioned options about the WDR, BLC, and DC are returned as settable parameters to the external apparatus 2000.

Furthermore, in the transaction 6054 for SetImagingSettings, a Level parameter for specifying the effective intensity can be affixed to the WDR the value of which is ON. Similarly, in this transaction, a Level parameter for specifying the effective intensity can be affixed to the DC the value of which is ON.

Furthermore, in the present exemplary embodiment, the Level parameter corresponding to the WDR the value of which is ON corresponds to a level (setting information) at which the WDR image synthesis processing unit 1006 brightens a captured image output from the imaging unit 1004. It is presumed that the value of the level is limited to within a predetermined range.

FIGS. 7A, 7B, 7C, and 7D illustrate a configuration example of a command in the transaction 6054 for SetImagingSettings. It is presumed that this command is described in Extensible Markup Language (XML).

FIG. 7A illustrates an example of the configuration of a SetImagingSettings command. This command is used to update setting parameters of the above-mentioned BacklightCompensation (7001), WideDynamicRange (7002), and DarkCompensation (7003).

The external apparatus 2000 notifies the imaging apparatus 1000 of the command illustrated in FIG. 7A, so that the above setting parameters, which are stored in the imaging apparatus 1000, are updated.

As illustrated in FIG. 7A, in the SetImagingSettings command, the setting parameter of BacklightCompensation (7001) is described before the setting parameter of WideDynamicRange (7002).

Furthermore, in the SetImagingSettings command, the setting parameter of WideDynamicRange (7002) is described before the setting parameter of DarkCompensation (7003).

FIGS. 7B to 7D illustrate the setting parameters. FIG. 7B illustrates a configuration of the setting parameter of BacklightCompensation (7001). The value of Mode of this setting parameter is ON. Furthermore, when the value of the Mode is ON, Level can be described in the setting parameter. The value of Level of the setting parameter is 1.8.

Furthermore, the setting parameter of BacklightCompensation (7001) in the present exemplary embodiment indicates activating backlight compensation processing, and corresponds to first image processing information indicating a level at which the backlight compensation processing brightens a captured image output from the imaging unit 1004.

As mentioned above, the value of Mode of BacklightCompensation (7001) is not limited to ON. The values of ON and OFF are alternatively set to the Mode.

Then, when the value of Mode is OFF, Level cannot be described in the setting parameter. Furthermore, in the ONVIF standard, the value of Level is a numeric value, and the unit of this value is defined as no unit. Moreover, in the ONVIF standard, while the range of the value is limited to a predetermined range, the upper limit and lower limit of the range can be freely specified by the individual manufacturers of imaging apparatuses.

Furthermore, it is presumed that, as the value of Level becomes larger, a captured image output from the imaging unit 1004 becomes brighter.

In the present exemplary embodiment, the Level parameter corresponding to the BLC the value of which is ON corresponds to a level (setting information) at which the exposure compensation processing unit 1005 brightens a captured image output from the imaging unit 1004.

FIG. 7C illustrates a configuration of the setting parameter of WideDynamicRange (7002). The value of Mode of this setting parameter is ON. Furthermore, when the value of the Mode is ON, Level can be described in the setting parameter.

Furthermore, the setting parameter of WideDynamicRange (7002) in the present exemplary embodiment indicates activating WDR processing, and corresponds to synthesis information indicating a level at which the WDR processing brightens a captured image output from the imaging unit 1004. As mentioned above, the value of Mode of WideDynamicRange (7002) is not limited to ON. The values of ON and OFF are alternatively set to the Mode.

Then, when the value of the Mode is OFF, Level cannot be described in the setting parameter. Furthermore, in the ONVIF standard, the value of Level is a numeric value, and the unit of this value is defined as no unit. Moreover, in the ONVIF standard, while the range of the value is limited to a predetermined range, the upper limit and lower limit of the range can be freely specified by the individual manufacturers of imaging apparatuses.

Furthermore, it is presumed that, as the value of Level becomes larger, a captured image output from the imaging unit 1004 becomes brighter.

FIG. 7D illustrates a configuration of the setting parameter of DarkCompensation (7003), which indicates examples of parameter values corresponding to settings illustrated in FIG. 8. The value of Mode in the setting parameter is AUTO.

As mentioned above, the value of Mode of DarkCompensation (7003) in the present exemplary embodiment is not limited to AUTO. The values of ON, OFF, and AUTO are alternatively set to the Mode.

Furthermore, when the value of the Mode is ON, Level can be described in the setting parameter. On the other hand, when the value of the Mode is OFF or AUTO, Level cannot be described in the setting parameter.

Furthermore, in the ONVIF standard, the value of Level is a numeric value, and the unit of this value is defined as no unit. Moreover, in the ONVIF standard, the range of the value is limited to a predetermined range, more specifically, which is defined as a range from 0 to +1.0. Furthermore, it is presumed that, as the value of Level becomes larger, a captured image output from the imaging unit 1004 becomes brighter.

In the present exemplary embodiment, the Level parameter corresponding to the DC the value of which is ON corresponds to a level (setting information) at which the exposure compensation processing unit 1005 brightens a captured image output from the imaging unit 1004.

Furthermore, the SetImagingSettings command in the present exemplary embodiment corresponds to a single command in which both synthesis information about an operation of the exposure compensation processing unit 1005 and image processing information about an operation of the WDR image synthesis processing unit 1006 can be described.

FIG. 8 illustrates an example of a conversion table of values of the Level described in the setting parameter for the DC in the SetImagingSettings command that the imaging apparatus 1000 has acquired from the external apparatus 2000. While, in the present exemplary embodiment, dark compensation processing is described as an example of exposure compensation processing, this is not restrictive. In the conversion table, the upper row indicates values of the Level in the SetImagingSettings command which has been set via communication based on the ONVIF protocol from the external apparatus 2000. The lower row indicates values of the Level actually set to the exposure compensation processing unit 1005, which is associated with the Level in the SetImagingSettings command, in the imaging apparatus 1000. The conversion table illustrated in FIG. 8 is stored in the storage unit 1002 and is then used according to the reception of a command from the external apparatus 2000.

More specifically, the values of the Level between 0 to 1 described in the command received from the external apparatus 2000 are divided into 7 stages of values of the Level based on the table stored in the storage unit 1002 included in the imaging apparatus 1000. For example, in a case where the value "0.12" of the Level is described in the command received from the external apparatus 2000, the imaging apparatus 1000 converts that value into "1" as a value of the Level actually set for dark compensation. Then, the imaging apparatus transmits, to the external apparatus 2000, the converted value as a response. The details of this operation are described below with reference to FIG. 9.

Furthermore, in the present exemplary embodiment, the conversion table corresponds to conversion information used for conversion of the setting information.

On the other hand, in a case where a request for the value of the Level actually set to the exposure compensation processing unit 1005 is received via a communication conforming to a unique protocol from the external apparatus 2000, the imaging apparatus 1000 does not perform conversion of the value. In other words, the imaging apparatus 1000 returns, in response to the request from the external apparatus 2000, the value of the Level actually set to the exposure compensation processing unit 1005. The details of this operation are also described below with reference to FIG. 9.

Such a conversion operation is performed by the control unit 1001. Thus, the control unit 1001 corresponds to a value conversion unit.

Furthermore, while an example of the conversion table is described in the present exemplary embodiment, the imaging apparatus 1000 may store a plurality of conversion tables, which are to be switched according to a shooting condition or an object condition, or may calculate a converted value using a predetermined mathematical expression.

Figure 9:
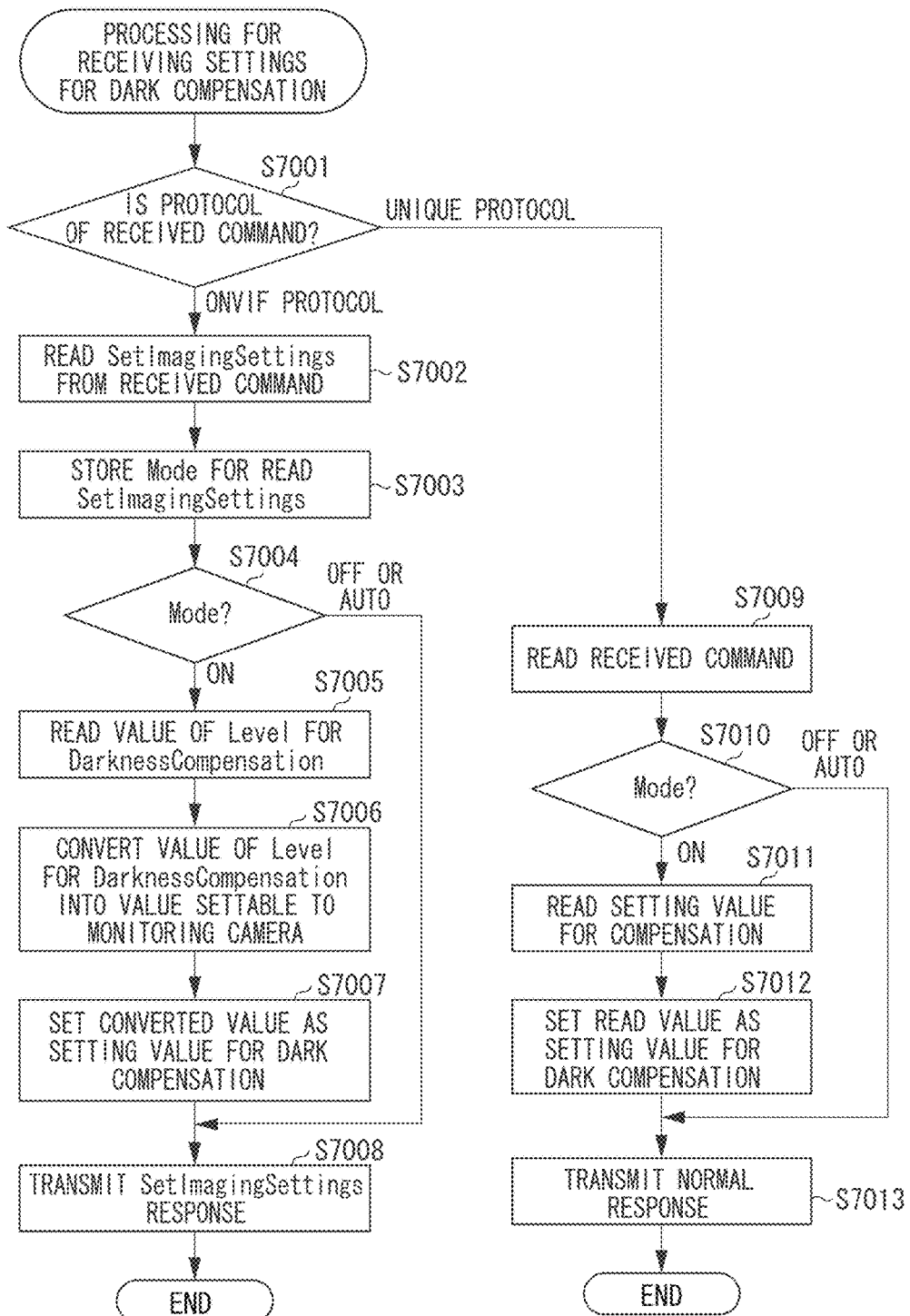
FIG. 9 is a flowchart illustrating processing for receiving settings for dark compensation.

FIG. 9 is a flowchart illustrating processing for receiving settings of a value of the Level for dark compensation in the SetImagingSettings command. This processing is executed by the control unit 1001. The following description focuses attention on a parameter for the DC, as an example, in the ImagingSettings.

The control unit 1001 starts processing in the flowchart illustrated in FIG. 9 after receiving the SetImagingSettings command or setting information conforming to a unique protocol, which has been communicated from the external apparatus 2000, 2100, or the like.

First, in step S7001, the control unit 1001 determines to which standard a protocol of the command received from the external apparatus 2000, 2100, or the like conforms. If it is determined that the protocol conforms to the ONVIF standard (ONVIF PROTOCOL in step S7001), the processing proceeds to step S7002. On the other hand, if it is determined that the protocol conforms to a unique protocol other than the ONVIF standard (UNIQUE PROTOCOL in step S7001), the processing proceeds to step S7009.

Here, to which standard the protocol conforms is determined by determining the descriptive content used for communication. For example, the control unit 1001 acquires a request line. The ONVIF standard uses the HyperText Transfer Protocol (HTTP). The term "request line" means the first line (descriptive content) in the HTTP text message. The request line is also called a "start line". The imaging apparatus 1000 analyzes a message of the request line. Thus, the control unit 1001 determines a protocol used in the received command.

Furthermore, the control unit 1001 may be configured to determine a protocol by, instead of analyzing a request line, using another description or method.

In step S7002, the control unit 1001 reads SetImagingSettings from information included in the received command, and stores the read SetImagingSettings into the storage unit 1002. Then, the processing proceeds to step S7003.

In step S7003, the control unit 1001 reads a value of the Mode for the DarkCompensation in the SetImagingSettings read in step S7002. Then, the processing proceeds to step S7004.

In step S7004, the control unit 1001 determines the value of the Mode read in step S7003. If the value is ON (ON in step S7004), the processing proceeds to step S7005. If the value is OFF or AUTO (OFF OR AUTO in step S7004), the processing proceeds to step S7008.

In step S7005, the control unit 1001 reads a value of the Level for the DarknessCompensation. Then, the processing proceeds to step S7006.

In step S7006, the control unit 1001 refers to the conversion table illustrated in FIG. 8 and converts the value of the Level for the DarknessCompensation described in the received command into a value that is settable to the imaging apparatus 1000. Then, the processing proceeds to step S7007.

In step S7007, the control unit 1001 sets, to the exposure compensation processing unit 1005, the converted value as a setting value for the value of the Level for the DarknessCompensation. Then, the processing proceeds to step S7008.

In step S7008, the control unit 1001 transmits a SetImagingSettings response so as to communicate to the external apparatus 2000 that the setting of the value of the Level for the DarknessCompensation of the imaging apparatus 1000 has been completed. Then, the processing ends.

On the other hand, in step S7009, as the communication is being performed according to a unique protocol, the control unit 1001 reads the received command. Then, the processing proceeds to step S7010.

In step S7010, the control unit 1001 determines the Mode read and stored in step S7009. If the Mode is a mode to activate compensation (ON mode) (ON in step S7010), the processing proceeds to step S7011. If the Mode is a mode to stop compensation (OFF mode) or a mode to automatically determine compensation (AUTO mode) (OFF OR AUTO in step S7010), the processing proceeds to step S7013.

In step S7011, the control unit 1001 reads a setting value (setting information) for compensation from the received command. Then, the processing proceeds to step S7012.

In step S7012, the control unit 1001 sets the read setting value as a setting value for dark compensation. More specifically, the control unit 1001 sets the read setting value to the exposure compensation processing unit 1005. Then, the processing proceeds to step S7013.

In step S7013, the control unit 1001 transmits a normal response so as to communicate to the external apparatus 2000 that the setting of the imaging apparatus 1000 has been completed. Then, the processing ends.

As described in the foregoing, in a case where the protocol of the received command is the ONVIF protocol, the imaging apparatus 1000 determines the Mode and, if the Mode is the ON mode, appropriately sets a setting value for dark compensation by appropriately using a conversion table stored in the imaging apparatus 1000. As a result, an appropriate image can be obtained.

If the Mode is the OFF mode or the AUTO mode, the imaging apparatus 1000 uses a previously-set setting value for dark compensation. As a result, an appropriate image can be obtained.

Furthermore, in a case where the protocol of the received command is a unique protocol, the imaging apparatus 1000 determines the Mode and, if the Mode is the ON mode, reads a setting value for compensation. As a result, an appropriate image can be obtained.

If the Mode is the OFF mode or the AUTO mode, the imaging apparatus 1000 uses a previously-set value of the Level for dark compensation. As a result, an appropriate image can be obtained.

As described above, even if there is a plurality of communication protocols for the imaging apparatus 1000, a conversion table used to convert the value of the Level for DarknessCompensation can be used. Then, when the imaging apparatus 1000 performs shooting using the converted setting value, an image subjected to appropriate dark compensation can be obtained.

Figure 10:
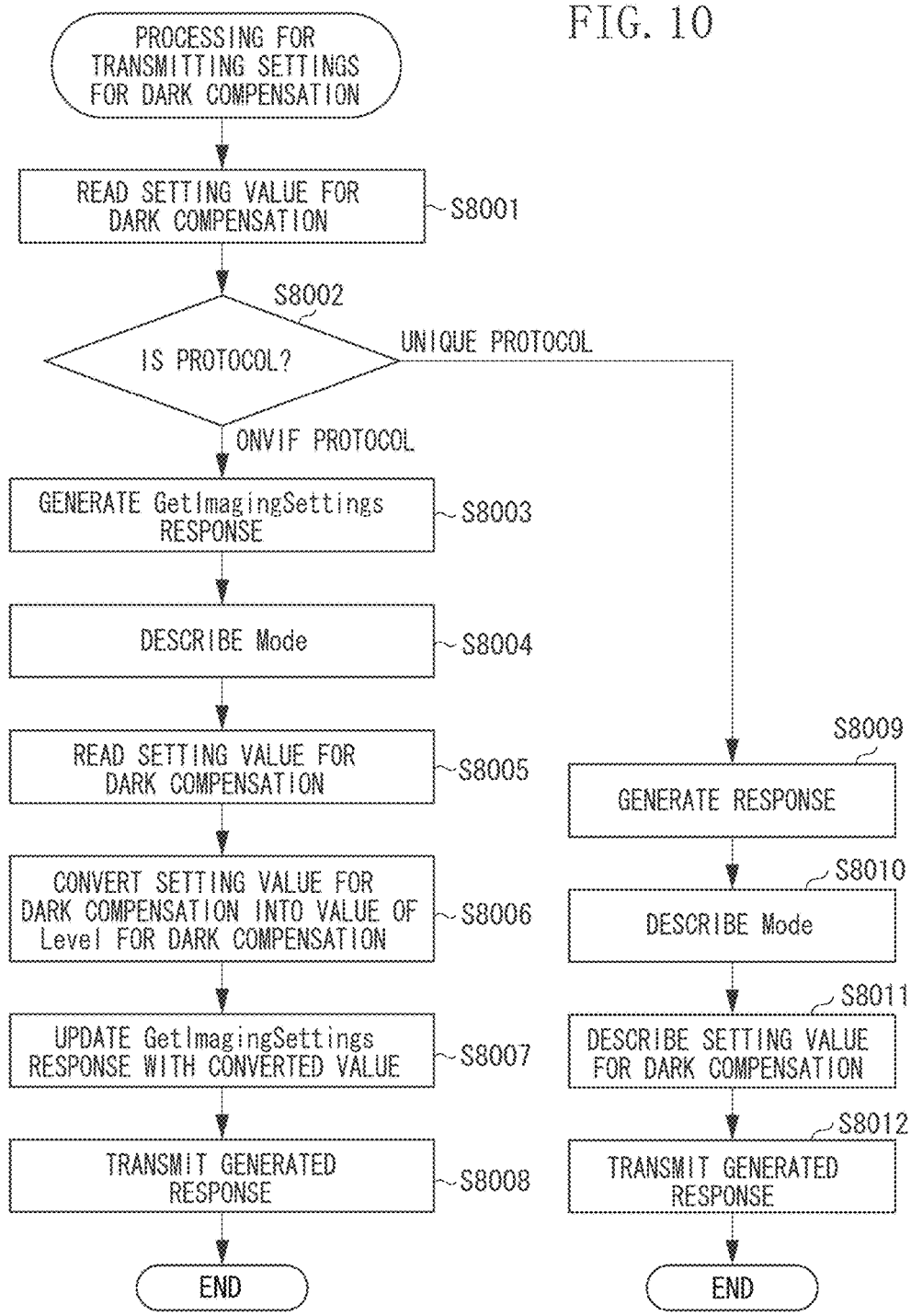
FIG. 10 is a flowchart illustrating processing for transmitting settings for dark compensation.

FIG. 10 is a flowchart illustrating processing in which the imaging apparatus 1000, having received the GetImagingSettings command, transmits a response to the external apparatus 2000, 2100, or the like. This processing is executed by the control unit 1001. The following description focuses attention on a parameter for dark compensation (DC), as an example, in the ImagingSettings. This processing enables the external apparatus 2000, 2100, or the like to recognize a setting value for dark compensation in the imaging apparatus 1000.

The control unit 1001 starts processing in the flowchart illustrated in FIG. 10 after receiving the GetImagingSettings command or the like, which has been communicated from the external apparatus 2000, 2100, or the like.

First, in step S8001, the control unit 1001 reads a setting value for dark compensation (the value of the Level). Then, the processing proceeds to step S8002.

In step S8002, the control unit 1001 determines to which standard a protocol of the command received from the external apparatus 2000, 2100, or the like conforms. If it is determined that the protocol conforms to the ONVIF standard (ONVIF PROTOCOL in step S8002), the processing proceeds to step S8003. On the other hand, if it is determined that the protocol conforms to a unique protocol other than the ONVIF standard (UNIQUE PROTOCOL in step S8002), the processing proceeds to step S8009.

In step S8003, the control unit 1001 generates a response to the GetImagingSettings command (a GetImagingSettings response), and stores the generated response into the storage unit 1002. Then, the processing proceeds to step S8004.

In step S8004, the control unit 1001 describes the Mode on the generated response. More specifically, the control unit 1001 updates the content of the Mode of the GetImagingSettings response stored in the storage unit 1002. Then, the processing proceeds to step S8005.

In step S8005, the control unit 1001 reads a setting value for the Level of dark compensation. Then, the processing proceeds to step S8006.

In step S8006, the control unit 1001 converts the setting value for dark compensation into a value of the Level for DC using a conversion table which is described below with reference to FIG. 11. Then, the processing proceeds to step S8007.

In step S8007, the control unit 1001 updates the content of the GetImagingSettings response stored in the storage unit 1002 with the converted value. Then, the processing proceeds to step S8008.

In step S8008, the control unit 1001 causes the communication unit 1003 to transmit, to the external apparatus 2000, 2100, or the like, the response generated until step S8007. Then, the processing ends.

On the other hand, in step S8009, as the protocol of the command conforms to a unique protocol, the control unit 1001 generates a response to the request from the external apparatus 2000, 2100, or the like. The control unit 1001 stores the generated response into the storage unit 1002. Then, the processing proceeds to step S8010.

In step S8010, the control unit 1001 describes the Mode on the generated response. More specifically, if the Mode is a mode to activate compensation, the control unit 1001 describes "ON" on the response. Then, the processing proceeds to step S8011.

In step S8011, the control unit 1001 describes a setting value (setting information) for the Level for dark compensation on the response. More specifically, the control unit 1001 updates the response stored in the storage unit 1002 with the Level for dark compensation. Then, the processing proceeds to step S8012.

In step S8012, the control unit 1001 causes the communication unit 1003 to transmit, to the external apparatus 2000, 2100, or the like, the response generated until step S8011. Then, the processing ends.

FIG. 11 illustrates a conversion table which is used for conversion in step S8006 illustrated in FIG. 10 if the protocol of the command is the ONVIF protocol.

In a case where the protocol used for communication is the ONVIF protocol, if the imaging apparatus 1000, when transmitting a setting value to be used for dark compensation, directly transmits the setting value stored in the imaging apparatus 1000, the external apparatus cannot recognize the setting value. For example, in a case where the imaging apparatus 1000 stores the setting value as a value compliant with the unique protocol, it is necessary to re-convert the stored setting value into a value recognizable with the ONVIF protocol.

In the conversion table illustrated in FIG. 11, the lower row indicates values of the Level in the SetImagingSettings command set and communicated (transmitted) based on the ONVIF protocol from the external apparatus 2000. The upper row indicates values of the Level actually set to the exposure compensation processing unit 1005, which is associated with the Level in the SetImagingSettings command. The values in the upper row and the values in the lower row are associated with one another. The conversion table illustrated in FIG. 11 is stored in the storage unit 1002, and is used according to the reception of a command from the external apparatus 2000.

With regard to re-conversion from the values indicated on the upper row to the values indicated on the lower row in the conversion table, no range is set for each value. Therefore, for example, if the value of the Level for dark compensation is set to "1" inside the imaging apparatus 1000, the external apparatus 2000 can recognize that the value of the Level is "0.07".

Figure 12A:
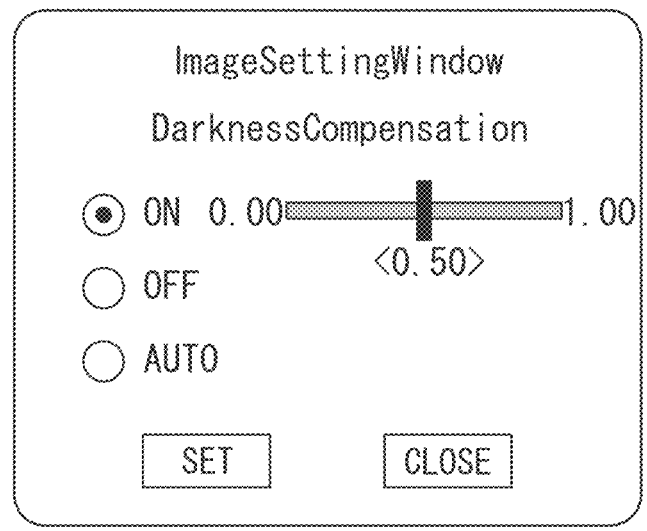
FIGS. 12A and 12B illustrate examples of setting screens displayed on the external apparatus.
Figure 12B:
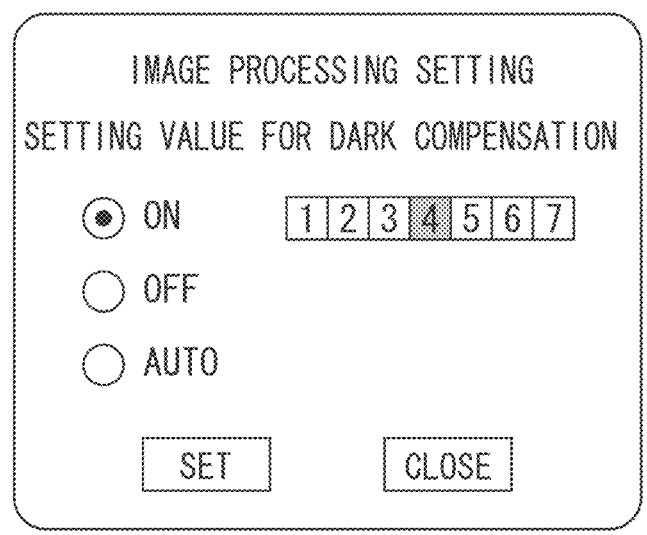

FIGS. 12A and 12B illustrate examples of setting screens displayed after the value of the Level is transmitted to the external apparatus 2000, 2100, or the like. Each of the setting screens is displayed on the display unit 2006 of the external apparatus 2000, 2100, or the like. FIG. 2A illustrates a setting screen displayed according to the ONVIF protocol, and FIG. 2B illustrates a setting screen displayed according to a unique protocol.

As illustrated in FIG. 12A, when the imaging apparatus 1000 has transmitted, to the external apparatus 2000, the value of the Level for dark compensation, which has been set by conversion using the conversion table illustrated in FIG. 11, the setting screen using the ONVIF protocol is displayed to enable the user to recognize that the Mode is set to ON (the dark compensation level being indicated by a slider to be "0.50"), OFF, or AUTO.

Furthermore, as illustrated in FIG. 12B, the setting screen using the unique protocol is displayed to enable the user to recognize that the Mode is set to ON (the dark compensation level being indicated to be "4"), OFF, or AUTO.

Thus, the user can appropriately recognize the setting value of the imaging apparatus 1000 via the external apparatus 2000, 2100, or the like.

As described above, the present exemplary embodiment enables providing an imaging apparatus that is capable of performing appropriate exposure compensation processing even if there is a difference in manufacturer or type between the imaging apparatus and an external apparatus connected thereto.

While, in the present exemplary embodiment, a description has been made with respect to setting information for exposure compensation processing as an example, a similar effect can be obtained even for other correction processing by similarly using a conversion table.

Furthermore, while, in the present exemplary embodiment, in step S7006 illustrated in FIG. 9 and step S8006 illustrated in FIG. 10, the imaging apparatus 1000 converts the setting value in the case of communication using the ONVIF protocol, the imaging apparatus 1000 may convert the setting value in the case of communication using a unique protocol. In that event, the imaging apparatus 1000 previously stores the setting values defined in the unique protocol into the storage unit 1002. Moreover, the imaging apparatus 1000 may convert the setting value both in the case of communication using the ONVIF protocol and in the case of communication using a unique protocol without recourse to protocols. In that event, the imaging apparatus 1000 previously stores conversion tables associated with the respective protocol types into the storage unit 1002.

Furthermore, the present invention can be implemented by executing the following processing. Software (computer program) for implementing the functions of the above-described exemplary embodiment is supplied to a system or apparatus via a network or any type of computer-readable storage medium. Then, a computer (central processing unit (CPU) or micro processing unit (MPU)) of the system or apparatus reads and executes the computer program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119050 filed Jun. 9, 2014, which is hereby incorporated by reference herein in its entirety.

What is claimed is:

1. An image processing apparatus capable of communicating with an external apparatus via a network, the image processing apparatus comprising:
    a processor; and
    a memory for storing instructions to be executed by the processor,
    wherein, when the instructions stored in the memory are executed by the processor, the image processing apparatus functions as:
    a correction processing unit for performing correction processing of an image;
    a reception unit for receiving a command including setting information from the external apparatus, wherein the setting information indicates a value of a parameter for the correction processing;
    a determination unit for determining whether a communication protocol of the command is a first communication protocol or a second communication protocol; and
    a first conversion unit for converting the value of the parameter indicated by the setting information, in a case where the communication protocol of the command is the first communication protocol,
    wherein the first conversion unit does not convert the setting information, in a case where the communication protocol of the command is the second communication protocol, and
    wherein the first conversion unit converts the value of the parameter indicated by the setting information, such that values included in a first range are converted to a first value which is settable to the image processing apparatus and values included in a second range are converted to a second value which is settable to the image processing apparatus, wherein the values included in the second range are larger than the values included in the first range, and the second value is larger than the first value.

2. The image processing apparatus according to claim 1, further comprising a first storage unit for storing conversion information for converting the value of the parameter,
    wherein the first conversion unit uses the conversion information to convert the value of the parameter.

3. The image processing apparatus according to claim 1, further comprising:
    a second storage unit for storing the setting information;
    a second conversion unit for converting the value of the parameter indicated by the setting information stored in the second storage unit according to a result of determination by the determination unit; and
    a transmission unit for transmitting the setting information in which the value has been converted by the second conversion unit.

4. The image processing apparatus according to claim 1, wherein the correction processing includes at least one of dynamic range widening processing, backlight compensation processing, and dark compensation processing of an image.

5. The image processing apparatus according to claim 1, wherein the setting information includes information for setting intensity of correction.

6. A control method for an image processing apparatus capable of communicating with an external apparatus via a network, the control method comprising:
    performing correction processing of an image;
    receiving a command including setting information from the external apparatus, wherein the setting information indicates a value of a parameter for the correction processing;
    determining whether a communication protocol of the command is a first communication protocol or a second communication protocol; and converting the value of the parameter indicated by the setting information, in a case where the communication protocol of the command is the first communication protocol, wherein the setting information is not converted in a case where the communication protocol of the command is the second communication protocol, and converting the value of the parameter indicated by the setting information, such that values included in a first range are converted to a first value which is settable to the image processing apparatus and values included in a second range are converted to a second value which is settable to the image processing apparatus, wherein the values included in the second range are larger than the values included in the first range, and the second value is larger than the first value.

7. A non-transitory computer-readable storage medium storing a computer program that causes a computer to perform the control method according to claim 6.

8. The image processing apparatus according to claim 1, wherein the correction processing unit executes exposure compensation processing.

9. The image processing apparatus according to claim 1, wherein the correction processing unit executes wide dynamic range image synthesis processing.

* * * * *